United States Patent [19]

Uemura et al.

[11] Patent Number: 5,005,277

[45] Date of Patent: Apr. 9, 1991

[54] AUTOMATED ASSEMBLY ARRANGEMENT FOR VEHICLE BODY AND METHOD OF ASSEMBLY

[75] Inventors: Satoshi Uemura, Tokyo; Susumu Kawada, Kamakura; Yoshitada Sekine, Yokohama; Tatsuo Miyauchi, Utsunomiya, all of Japan

[73] Assignee: Nissan Motor Co., Ltd., Yokohama, Japan

[21] Appl. No.: 282,190

[22] Filed: Dec. 9, 1988

[30] Foreign Application Priority Data

Dec. 10, 1987 [JP] Japan ................... 62-313023

[51] Int. Cl.⁵ .......................................... B23P 21/00
[52] U.S. Cl. ......................................... 29/407; 29/430; 29/712; 29/714; 29/720; 901/7; 901/9
[58] Field of Search ................. 29/407, 430, 712, 714, 29/720; 901/7, 9

[56] References Cited

U.S. PATENT DOCUMENTS

| | | | |
|---|---|---|---|
| 4,589,184 | 5/1986 | Asano et al. | 29/712 |
| 4,589,199 | 5/1986 | Ohtaki et al. | 29/712 |
| 4,654,949 | 4/1987 | Pryor | 29/702 |
| 4,691,905 | 9/1987 | Tamura et al. | 29/281.5 |
| 4,736,515 | 4/1988 | Catena | 29/714 |
| 4,757,608 | 7/1988 | Ochi | 29/703 |
| 4,852,237 | 8/1989 | Tradt et al. | 29/712 |

Primary Examiner—Howard N. Goldberg
Assistant Examiner—I. Cuda
Attorney, Agent, or Firm—Pennie & Edmonds

[57] ABSTRACT

A vehicle body is assembled in a number of stages each including robots which are automatically adjusted to move and secure work pieces such as panels to a basic body member or chasis. One of the stages includes a measuring arrangement which scans the assembled unit with laser beams to determine if the required tolerance have been set. In the event of deviations beyond permissible limits the appropriate correction is derived and fed back to the stage wherein the securing operation in question occured.

4 Claims, 4 Drawing Sheets

AUTOMATED ASSEMBLY ARRANGEMENT FOR VEHICLE BODY AND METHOD OF ASSEMBLY

BACKGROUND OF THE INVENTION

1. Field of the Invention

The present invention relates generally to a production line and more specifically to a robotized production line which enables the required degree in assembly precision to be achieved and minimize set up time and adjustment required to achieve the required precision.

2. Description of the Prior Art

A previously proposed assembly arrangement comprised the use of support arrangements each equipped with a number of gauge members on which panels could be supported and clamped in position. By moving either the support arrangement or bringing a structure such as a partially completed vehicle body, to the support, the panel could be held in the appropriate position with respect to the body and in a manner which facilitates spot welding of the panel to the same.

However, this arrangement has suffered from the drawbacks that the gauge members each required a hydraulic or pneumatically operated latch-like members which could be swung into position in a manner to clamp the panel (work piece) in position in the gauges during the welding or like operation. As the clamping members were required to be shaped so that when they were closed down on the gauge sections the resulting aperture corresponded to the cross-sectional shape of the panel or component to be supported by the same, the variety of panels and/or components which could be supported by any one support arrangement was severely limited.

Further, due to the rigidity distribution of the panels, when the latch-like members were swung to their released positions, the panels tended to, in some circumstances, undergo a "spring back" phenomenon or the like, and induce the situation wherein they tended to distort and or change position in an unintended manner.

To overcome this problem it was found necessary to isolate and manually adjust the positions of the problematical gauges in a manner wherein, when the clamping action was removed, the panels would not undergo undesirable changes in configuration and/or position. However, this adjustment has proven extremely time consuming and, in combination with the fact that when the line was modified and required the provision and set of new gauge members (including the above mentioned type of fine adjustment), was such as to badly impair the utility of the arrangement.

To overcome this problem an arrangement of the nature disclosed in JP-A-59-144595 and U.S. Pat. No. 4,691,905 issued on Sept. 8, 1987 in the name of Tamura et al, was proposed. This arrangement features the use of work piece locating devices which include gauge members which can be selectively shaped in accordance with the profile and shape of the work piece to be supported. Using these arrangements in combination with articulated robotic support arrangements which permit the gauges to be moved in three dimensions, a number of panels and components can be selectively moved into predetermined positional relationships with one and other wherein they can be spot welded together.

However, this type of arrangement has met with only partial success in that a long time is required to set up the system and once in operation requires constant surveilance in order to reset the various elements in the case of a drift in setting which permits the assembly accuracy to fall outside the permitted tolerances. Viz., in the case the robots are provided with a control program it is normal that an operator will "teach" each robot what to do during the initial set up stages. This teaching involves manually controlling the mechanism in a manner wherein the operator actually performs the assembly operation. Once the appropriate movements are recorded the robot is able to mimic the manually induced set of operations and thus reproduce the human ability. Accordingly, when a change in production is required an operator must re-teach the robots in accordance with the new or modified tasks which are now required. By way of example only, when the production of a sedan model changes to the corresponding stationwagon, while the forward end of the vehicle will remain essentially the same, the rear portion will have different panels and require that the robots be taught how to manipulate the same into place and secure the same by welding.

SUMMARY OF THE INVENTION

It is an object of the present invention to provide a system which is totally automated and which can quickly set the assembly arrangement and adjust the same to produce the required precision within a short time and which constantly monitors the assembly to ensure the required tolerances are met.

In brief, the above object is achieved by an arrangement wherein a vehicle body or the like is assembled in a number of stages each of which includes robots which are automatically adjusted to move and secure work pieces such as panels and the like components to a basic body member or chassis. One of the stages includes a measuring arrangement which scans the assembled unit with laser beams to determine if the required tolerances have been met. In the event of deviations beyond permissible limits the appropriate correction is derived and fed back to the stage wherein the securing operation in question occured.

More specifically, a first aspect of the present invention is deemed to comprise an assembly arrangement wherein a plurality of work pieces are to be connected to a body with a given degree of precision, the assembly arrangement featuring: means for determining the various positions in which the plurality of work pieces should be disposed relative to the body using pre-recorded data which relates to the design of the structure; a first stage, the first stage including work support means for supporting and moving the plurality of work pieces into the determined positions relative to the body; means for fixing the work pieces to the body, the fixing means being disposed in the first stage; means for determining the correct positions of a plurality of reference points defined on each of the plurality of panels, using prememorized structure design data; a second stage, the second stage separate from the first stage and including structure measuring means for determining the actual positions of the plurality of reference points; means for determining the deviation between each of the actual and the correct reference points using the pre-recorded data; a memory bank, the memory bank containing the prememorized data and inference data which is used in combination with the pre-memorized data in a manner to determine correction values for correcting the operation of the work support means in the first stage in a manner which reduces the magnitude of the deviations detected in the second stage.

A second aspect of the present invention is deemed to comprise a method of assembling a structure wherein a plurilty of work pieces are connected to a body with a given degree of precision, the method featuring the steps of: determining the various positions in which the plurality of work pieces should be disposed relative to the body using pre-recorded data which relates to the design of the structure; using work support means to support and move the plurality of work pieces into the determined positions relative to the body, the work support means being disposed in a first stage; fixing the work pieces to the body using fixing means disposed in the first stage; determining the correct positions of a plurality of reference points defined on each of the plurality of panels, using the pre-recorded structure design data; determining the actual positions of the plurality of reference points using structure measuring means, the structure measuring means being disposed in a second stage which is separate from the first stage; determining the deviation between each of the actual and the correct reference points; using the pre-recorded data in combination with inference data stored in a data so as to determine correction values for correcting any deviations which are in excess of predetermined tolerances in a manner which reduces or eliminates the deviations; and adjusting the work support means in the first stage using the correction values so as place the plurality of work pieces on the next body in manner which reduces the deviations detected in the second stage.

A third aspect of the present invention is deemed to comprise an assembly system which features; a work piece support robot, the work piece support robot being disposed in a first stage and having a jig with which a work piece can be supported, the jig including a device which can be shaped to assume the configuration of the portion of work piece which is to be engaged by the device, the work piece support robot being arranged to move the work piece into a predetermined relationship with a body to which the work piece is to be connected; a securing robot, the securing robot being disposed in the first stage and having a securing device via which the work piece can be secured to the body; means for transporting the body to a second stage; measuring means for measuring the disposition of the work piece on the body and for producing data from which the disposition can be interpreted, the measuring means being disposed in the second stage; control means responsive to the measuring means for controlling the operation of the work piece support and securing robots, the control means including: a memory in which design, assembly and inference data is stored; processing circuity containing means for using the design, assembly and inference data for interpreting the data from the plurality of measuring means and for producing control signals via which the work piece support and securing robots and the measuring means are respectively controlled, the control means being arranged to: move the robots from their home positions to ones wherein the work piece is supported in a position predetermined to place the work piece in the desired position on the body; induce the securing robot to secure the work piece to the body; induce the transport means to move the body to a second stage; induce the measuring means disposed in the second stage to measure the position of a predetermined reference point on the work piece, compare the actual position of the reference point with that derived from the design data and to determine if there is a deviation between the two points, and produce a correction value which is used to adjust the work piece support robot in a manner which tends to eliminate the deviation.

A fourth aspect of the present invention is deemed to comprise a method of assembly which features the steps of: supporting a work piece on a work support robot, the work piece support robot having a jig, the jig including a device which can be shaped to assume the configuration of the portion of work piece which is to be engaged by the device, the work support robot being disposed in a first stage; moving the work piece into a predetermined relationship with a body with which the work piece is to be connected; securing the work piece to the body using a securing robot; transporting the body to a second stage using transportation means; measuring the disposition of the work piece on the body in the second stage and producing data from which the disposition can be interpreted; controlling the operation of the work piece support robots by way of a control means, the control means including: a memory in which design, assembly and inference data is stored; and processing circuity containing means for using the design, assembly and inference data for interpreting the data from the plurality of measuring means and for producing control signals via which the work piece support and securing robots and the measuring means are respectively controlled, the control means being arranged to: move the robots from their home positions to ones wherein the work piece is supported in a position predetermined to place the work piece in the desired position on the body; induce the securing robot to secure the work piece to the body; induce the transport means to move the body to a second stage; induce the measuring means disposed in the second stage to measure the position of a predetermined reference point on the work piece, compare the actual position of the reference point with that derived from the design data and to determined if there is a deviation between the two points, and produce a correction value which is used to adjust the work piece support robot in a manner which tends to eliminate the deviation.

DETAILED DESCRIPTION OF THE PREFERRED EMBODIMENTS

Figure 1:
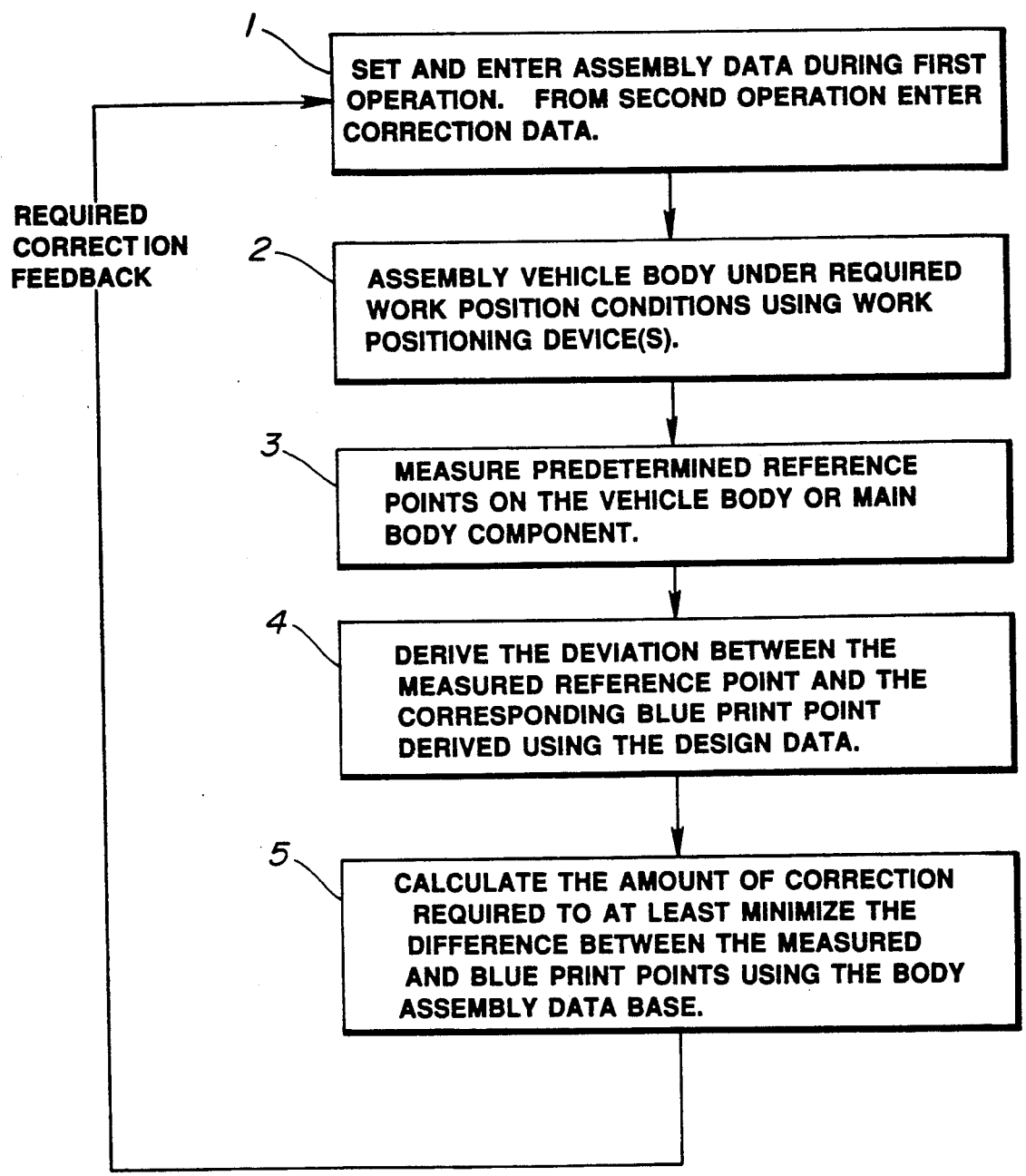
FIG. 1 is a block diagram showing the basic steps which are used in connection with the instant invention.
Figure 2:
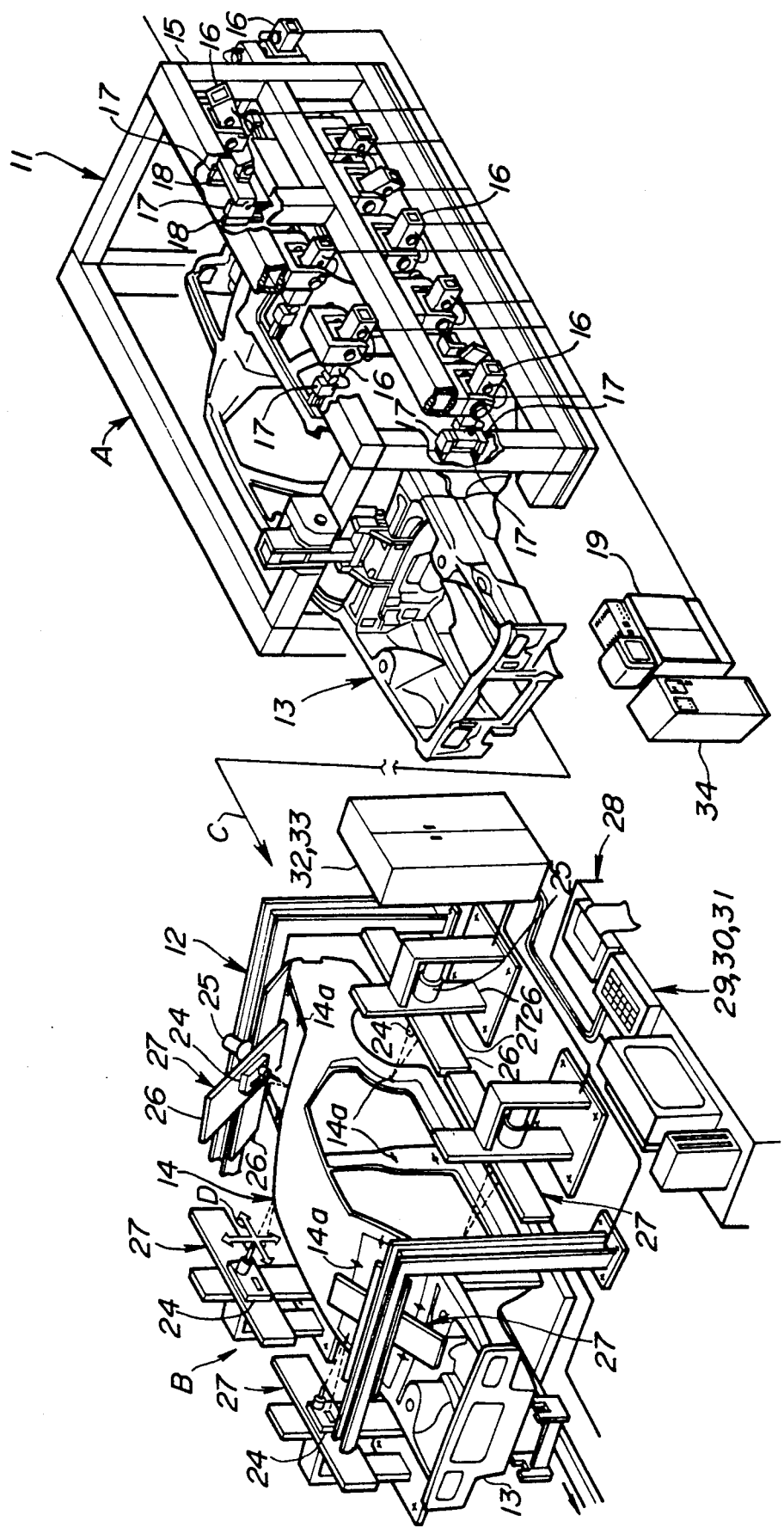
FIG. 2 is a perspective view of an assembly stage wherein a vehicle body is assembled and measured.

FIG. 2 is a perspective view showing a multi-stage vehicle body production line incorporating an embodiment of the present invention. In this drawings only first and second stages A, and B are shown for simplicity. However, as will become clear from the following disclosure, one or more stages are arranged between stages A and B and for the sake of explantion and drawing simplicity, the other stages have been omitted from the drawings.

The first stage A in this embodiment basically comprises rectangular framework in which a work positioning system 11 is installed. At this stage of the line the assembly of the main body section 13 (merely by way of example) is carried out. In this instance the left and right side panels, the rear panel, cowl top assembly and shelf panel are introduced into the stage and the work piece position system 11 moves the above mentioned panels into their respective positions relative to the main body component.

Following spot welding (or the like) which secures the panels in place, the vehicle body 14 is moved along shuttle conveyor to the next stage (not shown) wherein roof rail and roof panel components (by way of example only) are additionally disposed on the vehicle body and appropriately welded in place when determined to be located with sufficient accuracy. The assembly is then transferred from stage to stage until it reaches stage B. This stage includes a body measuring system 12 which is employed to scann the assembled body using laser beams and determine if the panels are assembled and secured with the required degree of precision and/or have any other forms of defects such as dents, deep scratches and the like blemishes.

At stage A, in order to locate the above mentioned side, rear and cowl top panels in their respective positions, frame 15 is arranged to support a plurality of robots 16 (forming part of the the work piece positioning system) each of which has a hand portion and work supporting jig 17. Selected robots 16 are further provided with pneumatic cylinder operated work clamp devices 18.

The work supporting jigs or units 17 include gauge devices 17a which each comprise a large number of thin plates which can be individually moved (via vibration or the like mechanical stimulous) in a manner to define a predetermined contour or shape and subsequently squeezed together in a manner wherein they are locked in position. In this embodiment the gauge devices 17a are individually set in predetermined shapes depending on the shape of the particular structural element to be supported by the same and the particular operation which is to be carried out. For further details concerning the contruction, arrangement and setting of the gauge devices 17a, reference may be had to U.S. Pat. No. 4,691,905 issued on Sept. 8, 1987 in the name of Tamura et al. The content of this document is hereby incorporated by reference thereto.

Following the shaping of the gauge devices 17a, the leading ends of the jigs are moved into the appropriate positions in a manner wherein the pre-shaped gauge devices 17a engage the respective work pieces which are to be secured to the main body member or section. As each of the gauge devices 17a have been pre-shaped to mate with the portion of the work piece which is engages, said work piece can be securely supported and moved into juxtaposition with the site to which it is to be connected. Upon being appropriately located with respect to the main vehicle body component or member 13, clamping devices 18 which are provided on predetermined robots 16, secure the panels to the main vehicle body section in a manner which holds the same ready for welding or the like type of securing operation.

Welding robots (not shown) which are provided at this stage are then induced to produce spot welding and permanently secure the panels in place.

Figure 3:
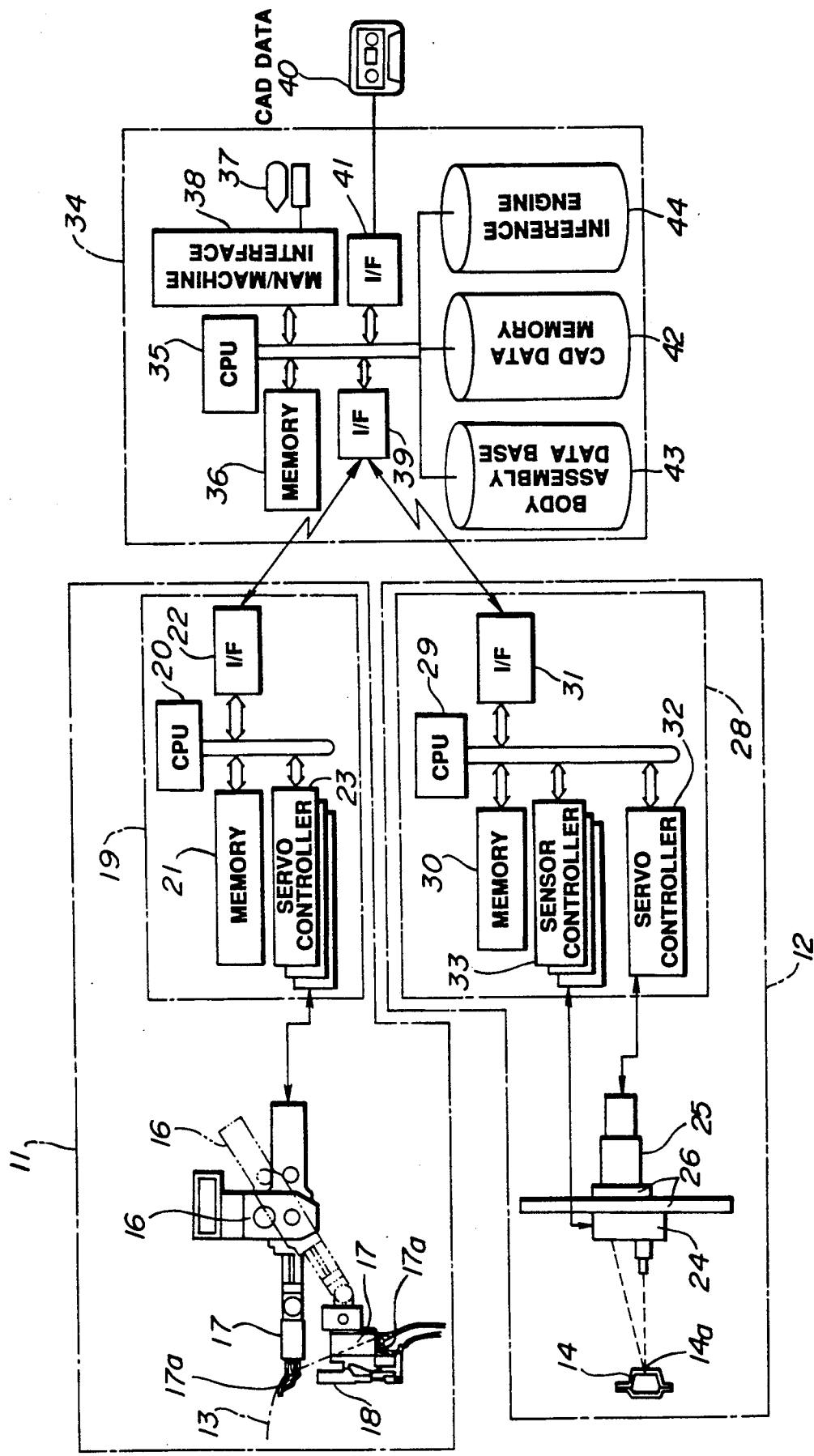
FIG. 3 is a schematic drawings depicting the hardware arrangement which is used in connection with the instant embodiment of the present invention.

In order to control the operations of the above, the hardware arrangement schematically shown in FIG. 3 is used. As will be apparent, this arrangement includes a robot control unit 19 which comprises a CUP 20, a memory 21, an I/O interface 22 and a plurality of servo controller units 23. The memory 21 contains data pertaining to the disposition of the work jigs 17 and the setting of the gauge devices 17a. The CPU 20 is arranged to process the data and to establish a feedback control wherein control and positional data is transferred back and forth between the various elements via a bus arrangement (no numeral). In accordance with the data inputted via the interface 22, the relevant data is read of the memory 21 and the appropriate control implemented.

On the other hand, the body measuring system 12 which is deployed in stage B includes a plurality of dimension measuring devices (six in the illustrated arrangement). These devices are each arranged to be movable in the directions indicated by the bold arrows D in FIG. 2. Each of the devices includes a scanner 24 which produces a laser beam and a servo motor 25 which is arranged to move the scanner vertically and horizontally along a guide arrangement 26. During operation, the scanners 24 are induced to produce laser beams which are projected against selected portions of the vehicle body and the position of the reflected beams detected in a manner which enables data which is indicative of the dimensions and distances of the scanned portions to be determined.

For more disclosure relating to the construction and operation of such devices reference may be had to co-pending U.S. patent applications Ser. No. 215,708 filed on July 6, 1988 in the name of Kawamura et al and No. 215,098 filed on July 5, 1988 in the name of Endo et al.

The first of these documents disclose a dimension measuring system wherein in order to accurately scan an object for the purposes of determining the dimensions, surface finish or the like, the position of the object according to the measuring system coodinate grid is determined. Using this orientation, the degree of misalingment with respect to a standard position on the grid is determined and the scanning devices which perform the actual measurement, are moved to positions which take the amount of misalingment into consideration and wherein accurate examination is assured.

The second relates to a dimension measuring system wherein in order to accurately measure the panel or structure under observation when a preselected parameter magnitude of a signal produced in response to a received reflected laser beam is excessively high, the power of the laser is reduced until such time a satisfactory level is reached. On the other hand when the signal is low and laser power cannot be increased further, amplification is induced until such time as the required level is produced.

The operation of the dimension measuring devices are controlled by a control circuit arrangement or unit 28. This arangement includes a CPU 29, a memory 30 and a plurality of servo controllers 32 and 33. In this instance the servo controllers 32 are connected to the motor and positional control arrangement of the scanners while the controllers 33 are operatively connected with the scanning mechanisms per se. An interface 33 is arranged to receive instruction data concerning when and where to scan and to output the resulting dimension indicative data which is obtained.

A central control arrangement 34 includes what is referred to as an expert system. This arrangement, as shown in FIG. 3, comprises a CPU 35, a memory 36, a man/machine interface 38 (in this case including a keyboard and display arrangement 37), an interface 39 which is arranged to transmit data to and receive data from, the interface arrangement 22 of the robot control unit 19 and the interface 31 of control unit 28 which controls the operation of the scanning devices.

The central control unit 34 (as it will be referred to herinafter) further includes a second interface arrangement 41 which is arranged to receive data input from a source such as cassete drive containing a streamer tape or the like. In this arrangement the cassete is arranged to contain CAD data which is recorded on a suitable memory device 42 which exhibits a large capacity and high speed access characteristics such as a magentic drum, hard disc or series of hard discs. In addition to the CAD memory, the central control unit further includes a body assembly data base memory device 43 and what shall be referred to a "logic engine" memory device 44. The latter mentioned memory is arranged to contain programs which can extrapolate and infer various results from the data available. In other words a kind of artificial intelligence (AI) system.

Figure 4:
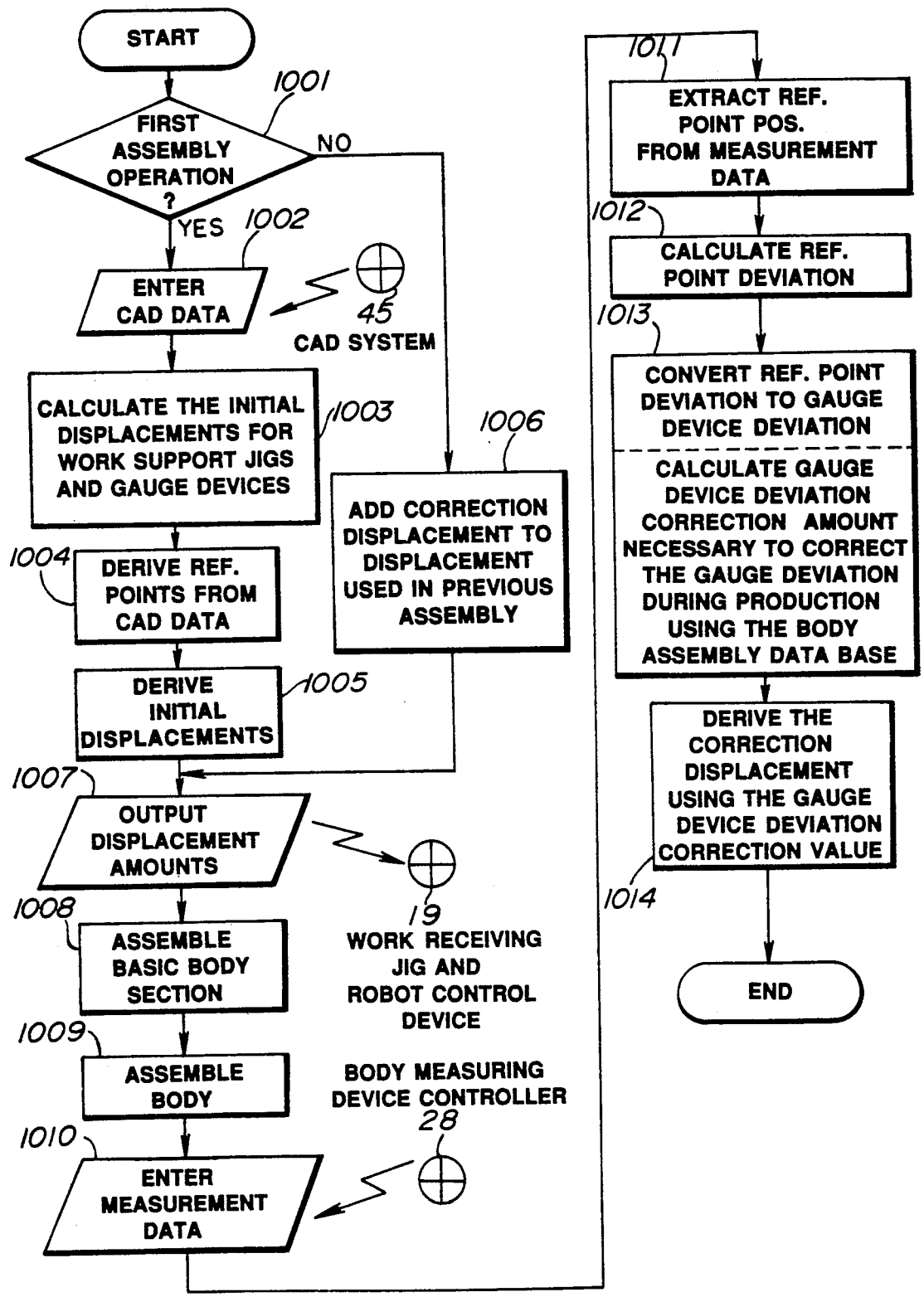
FIG. 4 is a flow chart showing the control steps which characterize the operation of the embodiment of the instant invention.

FIG. 4 shows, in flow chart form, the steps which characterize the operation of the above described system. The first step 1001 of this chart is arranged to enquire if the instant run of the illustrated program is the first or not. In the event that it is the initial one, then at step 1002 the CAD data is loaded into the central control unit 34 from the cassete drive or similar data source 40. When the data has been loaded and transferred to the CAD memory device 42, the program then flows to step 1003 wherein, depending on the panels to be attached, the positions of the work piece support units are determined in accordance with the respective gauge devices and input to the central control unit 34. Based on the CAD data, the control unit 34 then develops data which satifies the required positional relationship between the work piece support units, and calculates the position and displacements for each of the work support jig and gauge devices for each of the stages.

In addition to this, in order to induce the work support jigs 17 to assume the required positions, the amount of initial displacement of the units from their home positions is derived. Together with this, in order to achieve the shape to which each of the gauge devices must be set so as to correspond to the shape of the work piece to be supported thereby, the displacement by which each of the plates of the gauge devices must be displaced from their respective home positions is derived.

Following this, at step 1004 depending on the panel to be supported, the location of the reference point or points on the same which are used as scanning targets and which are used to determine the assembly accuracy are derived using the CAD data and input to the main control unit 34. The main control unit 34 then derives the "blue print" positions in which of these reference points should be located when the panels, which are to be disposed on the main vehicle body component at the instant assembly stage, are arranged with the required degree of precision. Viz., the panels are disposed in the positions according to the CAD data defined "blue print" of the vehicle body. Upon completion of this the program flows to the next step.

At step 1005 commands which induce the above mentioned initial displacement of the plates of the gauge devices 17a and of the respective work support jigs 17 are generated. At step 1007 these command signal are transmitted to the jig and robot control units 19 of each of the respective stages via the interfaces 22 and 39. Again it will be noted that although there are in fact a number of stages only the control arrangements for stages A and B have been shown. Further for the sake of simplicity explanation will be given as though there are only the two illustrated stages from this point it being that similar controls will apply to the other stages.

In the event that the outcome of the enquiry conducted at step 1001 indicates that the instant run is not the first, then the program by-passes step 1002–1005 and flows directly to step 1006. At this step, the program is such as to update the displacement values which were used in the immediately previous run and add correction values to the existing ones in a manner which adjusts for any deviations beyond an acceptable limit or the like by modifying the various displacement values and therefore modifing the positions in which the various panels are disposed prior to spot welding. As will become more apparent hereinlater, there may be some difficult in actually getting one or more of the panels to fit into exactly the required position. In this instance the robots 16 are suitably induced to try a different technique of moving the panel into position in a manner similar to a human operator if present.

This modifying process of course quickly eliminates any inaccuracies and ensures that the desired assembly precision is quickly established and maintained as will also become apparent as the disclosure proceeds. The manner in which these correction values are derived will be discussed hereinafter.

Step 1008 is such as to induce the various work piece support jigs 17 to move and set the various panels in place on the main vehicle body components in stage A and to subsequently induce the appropriate spot welding or like fastening of the same in place.

Following this, at stage 1009, suitable commands are issued to the various stages to induce the further assembly of the vehicle body and subsequent spot welding or the like fastening operations at the stages located between stages A and B.

Upon entering stage B the thus far completed vehicle body is subject to measurement by the body measuring system 12 which is used to scan the various predetermined points on the respective panels and input the data to the central control unit 34.

At step 1010, the positions of the reference points are determined based on the data collected in this step, the difference or deviation between each of the actual and corresponding blue print points is derived in step 1011.

At step 1012 the various position of the reference points which are determined in the previous step are compared with the corresponding "blue print" ones and any deviations therebetween calculated. Following this the magnitudes of any deviations that have been found to exist are compared with predetermined limits or tolerance values.

In step 1013 the deviation between the points in excess of the allowable tolerances are subject to conversion in a manner to derive the amount of displacement given plates of a given gauge or gauges need be changed to correct the deviation. Viz., in this step, the amount of deviation of the panel from the preferred location is converted into displacement correction values for the gauge devices 17a associated with the same.

In order to conduct the above mentioned conversion, the data contained in the body assembly data base and what shall be referred to as an "inference engine" is utilized in a manner wherein the position of each of the thin plates used in the gauge sections required to move the panel toward the desired position and to reduce or eliminate the sensed deviation, are derived and the change in displacement from the instant values determined. The so called "inference engine" is this instance contains what can be referred to as artificial intelligence type programs which can predict and extrapolate in a manner which allows for the appropriate displacement corrections to be ascertained in close to real time.

This is necessary in view of the number of different panels which are involved and the large number of different shapes, mutual relationships, displacements and orientations which are required to accurately assemble the same. In other words, in order to permit the maximum possible number of construction operations to be carried out on the main body component at the various assembly stages, the data base and the inference engine are teamed together so as to emulate the skilled worker in a manner to minimize or eliminate the deviations between the assembled body and the blue print version. To this end, the amount of displacement is derived, taking the structural rigidity of the adjacent panel or panels in question, into account, using a finite element and linear programming method. Using this technique the amount of displacement can be converted into suitable gauge section displacement correction values.

In other words, at step 1013, using the inputted CAD data to derive a model of the main body section as assembled in terms of the rigidity distribution etc., of the same, the differences between the actual and desired constructions are ascertained, the gauge section displacement correction values are read, and using a conversion equation which allows for the rigidity, the positions in which the work support jigs should be disposed are converted with respect to the deviation amount in real time. Following this, the inference engine deduces or infers the cause of the difference and uses the above mentioned difference and gauge section displacement correction amount to obviate the error which has induced the deviation. This correction management process is such that the required gauge section position related difference and correction amounts are derived, and based on the relationship of these two values.

At step 1014, the gauge section position correction amount data obtained in the previous stage (viz., step 1013) is used to derive the amount of displacement of the work support jig or jigs. This data is suitably stored and read out in step 1006 and added to the value used in the previous run.

As will be understood steps 1010 to 1014 are such as to derive the position of the reference points on the various panels and determine the relative displacement or deviation between these and the "blue print" ones derived using the CAD data. Following this the deviation is reduced or eliminated by feedback control which modifies the gauge section displacements by deriving a displacement correction. The process is repeated each run of the program and therefore quickly corrects any imperfections in the assembly control and ensures that the required tolerances are met.

It should be noted that in this instance the inference engine is arranged so that, in the event that the above method of reducing the difference between the actual and desired location of the reference points does not prove effective, the system is able to select another, preferably the next most appropiate method from among a number of possible different ones which have been programmed in case this very problem should occur.

It should also be noted that the invention is not limited to the use of spot welding and robots equipped with nut runners can be used to bolt selected components together if so desired.

What is claimed:

1. An arrangement wherein a work piece is to be connected with a given degree of precision to a structure, comprising:
   a first assembly stage;
   a second assembly stage which is separate and spaced from said first assembly stage;
   means for determining a position in which said work piece should be disposed relative to said structure using pre-recorded data which relates to the design of said structure;
   said first stage including:
   (a) work support means, controlled by an inference type processing means, for supporting and moving said work piece into the determined position relative to said structure; and
   (b) means for fixing said work piece to said structure;
   means for determining a correct position for each of a plurality of reference points defined on said work piece, using pre-recorded structure design data;
   shuttle conveyor means for moving the structure out of said first assembly stage into said second assembly stage;
   said second stage including: measuring means for determining a measured position of said plurality of reference points;
   means for determining the deviation between each said measured position and a corresponding one of said correct reference point positions using said pre-recorded data;
   a memory bank containing said pre-recorded data and said inference means, wherein said inference means is used in combination with said pre-recorded data to determine correction values for correcting the operation of said work support means in said first stage so as to reduce the magnitude of said deviations detected in said second stage.

2. In a method of assembling a structure wherein a plurality of work pieces are connected with a given degree of precision to a structure, the steps of:
   determining a position in which said plurality of work pieces should be disposed relative to said structure using pre-recorded data which relates to the design of said structure;
   using work support means to support and move said plurality of work pieces into the determined positions relative to said structure, said work support means being disposed in a first stage;
   fixing said work pieces to said structure using fixing means disposed in the first stage;
   determining a correct position for each of a plurality of reference points defined on each of said plurality of work pieces, using said pre-recorded data;
   moving said structure out of the first stage to a second separate stage which is paced from the first stage using shuttle conveyor means;
   determining a measured position for each among said plurality of reference points using a structure measuring means disposed in the second stage;

determining the deviation between each of said measured positions and its corresponding one from among said correct positions;

using said pre-recorded data in combination with inference data stored in a data storage means so as to determine correction values for correcting any deviations which are in excess of a predetermined tolerance in a manner which reduces or eliminates deviations; and adjusting said work support means in said first stage using said correction values such that the deviation magnitudes detected in said second stage derived from subsequent structures assembled in said first stage which have identical form to said structure from which said correction values were derived, have a reduced magnitude.

3. An assembly system comprising:

a work piece support robot disposed in a first stage and having a jig with which a work piece can be supported, said jig including a device which can be shaped to assume the configuration of a portion of said work piece, said portion to be engaged by said device, said work piece support robot being arranged to move said work piece into a predetermined relationship with a body to which the work piece is to be connected;

a securing robot disposed in said first stage and which has a securing device via which the work piece can be secured to said body;

means for transporting said body out of the first stage and into a second stage;

measuring means for measuring a disposition of said work piece on said body and for producing data from which the disposition can be interpreted, said measuring means being disposed in the second stage;

control means responsive to said measuring means for controlling the operation of said work piece support and securing robots, said control means including:

a memory in which design, assembly and inference data is stored;

processing means for using said design, assembly and inference data for interpreting the data from said measuring means and for producing control signals via which said work piece support and securing robots and said measuring means are respectively controlled, said control means being arranged to:

move said robots from their home positions to ones wherein the work piece is supported in a position predetermined to place the work piece in the desired position on said body;

induce the securing robots to secure the work piece to said body;

induce said transport means to move said body to a second stage;

induce the measuring means disposed in said second stage to measure the position of a pre-determined reference point on said work piece;

compare said measured position of said reference point with the position derived from the design data and determine if there is a deviation between the two positions, and produce a correction value which is used to adjust said work piece support robot in a manner which tends to eliminate said deviation.

4. A method of assembly comprising:

supporting a work piece on a support robot having a jig, said jig including a device which can be shaped to assume the configuration of a portion of said work piece, said portion to be engaged to said device, said work support robot being disposed in a first stage;

moving said work piece into a position which has a predetermined relationship with a body to which the work piece is to be connected;

securing the work piece to said body using a securing robot while said workpiece is in the first stage;

transporting the body from the first stage into a second stage using a transportation means;

measuring the disposition of said work piece on said body in said second stage and producing data from which said disposition can be interpreted;

controlling the operation of said work piece support robot by way of a control means, said control means including: a memory in which design, assembly and inference data is stored; and processing means for using said design, assembly and inference data for interpreting the data from said measuring means and for producing control signals via which the work piece and securing robots and said measuring means are respectively controlled, said control means being arranged to:

move said robots to positions wherein the work piece is supported in a position predetermined to place the work piece in a desired position on said body;

induce the securing robot to secure the work piece to said body;

induce said transport means to move said body to the second stage;

induce the measuring means disposed in said second stage to measure the position of a predetermined reference point on the work piece;

compare the measured position of said reference point with that derived from the design data and to determine if there is a deviation between the two positions; and produce a correction value which is used to adjust said work piece robot in a manner which tends to eliminate said deviation.

* * * * *